(No Model.) 2 Sheets—Sheet 2.
G. W. CISCO.
CAR BRAKE.
No. 407,575. Patented July 23, 1889.
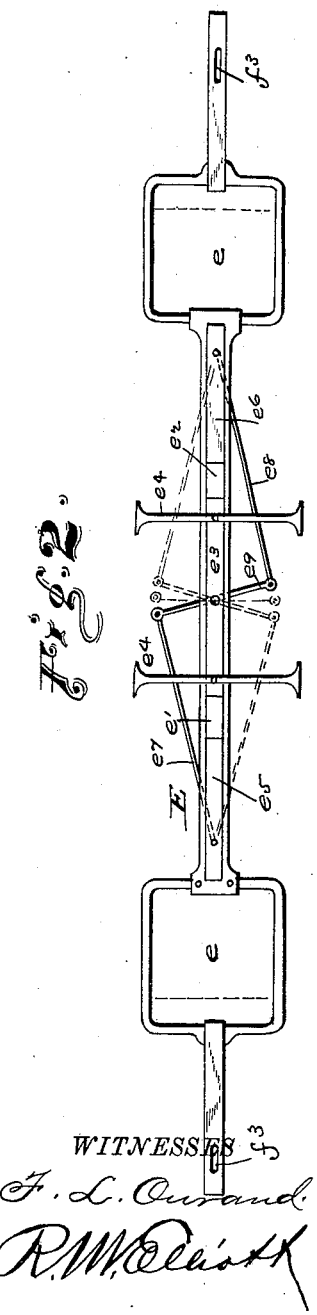
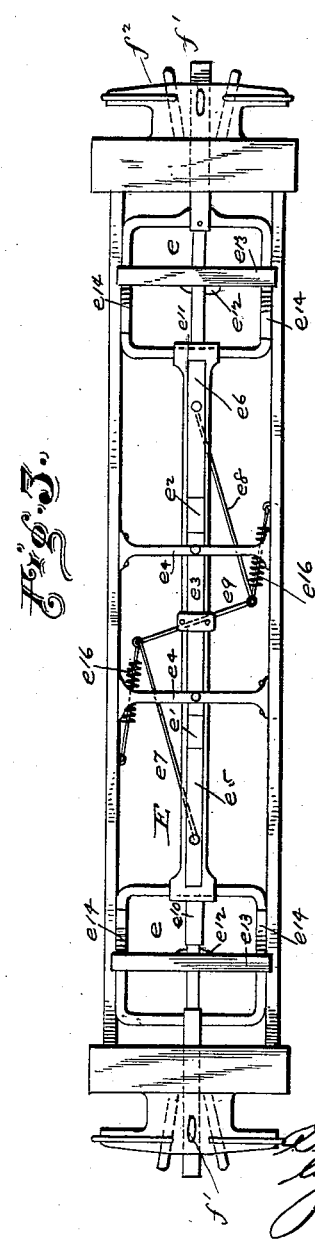
WITNESSES
F. L. Ourand
R. W. Elliott
INVENTOR
George W. Cisco,
by Louis Daggett,
Attorneys.

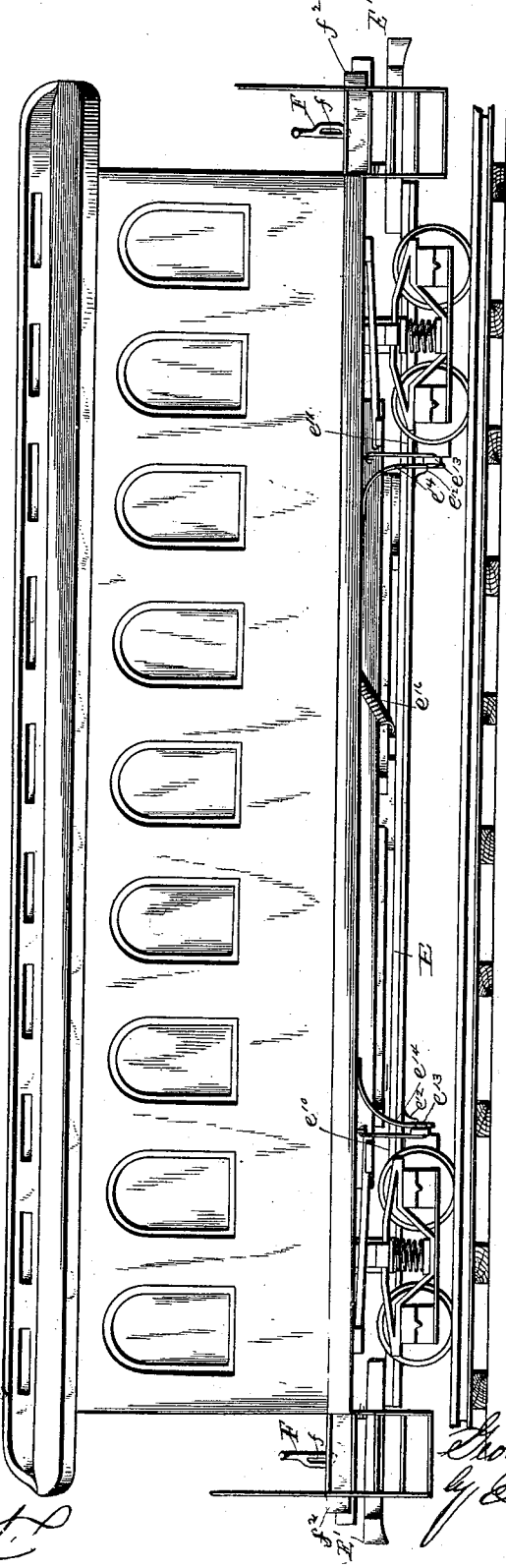

UNITED STATES PATENT OFFICE.

GEORGE WASHINGTON CISCO, OF MONTVALE, NEW JERSEY.

CAR-BRAKE.

SPECIFICATION forming part of Letters Patent No. 407,575, dated July 23, 1889.

Application filed April 2, 1888. Serial No. 269,287. (No model.)

*To all whom it may concern:*

Be it known that I, GEORGE WASHINGTON CISCO, a citizen of the United States, and a resident of Montvale, in the county of Bergen and State of New Jersey, have invented certain new and useful Improvements in Brakes; and I do hereby declare that the following is a full, clear, and exact description of the invention, which will enable others skilled in the art to which it appertains to make and use the same.

This invention relates to brakes.

The object is to produce a brake for use on railway-cars which shall be certain in operation, durable in use, and cheap of production.

With these objects in view, the invention consists in an automatic brake; furthermore, in the combination and operation of the various parts, whereby its objects are attained.

In the accompanying drawings forming part of this specification, and in which like letters of reference indicate corresponding parts—

Figure 1 is a side elevation of a car, showing my peculiar brake applied thereto. Fig. 2 is a plan view of the push-bar to be used for operating the brakes, and Fig. 3 is a similar view showing the entire brake-operating mechanism.

E designates a push-bar to be used on passenger-cars.

$e$ designates the portions that pass around the trucks, and $e'$ $e^2$ a hollow or box-shaped guide for connecting the said portions. The guide has a center piece $e^3$ placed in it, which is securely bolted to the stays $e^4$ of the car-frame.

$e^5$ $e^6$ designate slides which fit and move in the guide, to the ends of which are secured arms $e^7$ $e^8$, connecting with a lever $e^9$, pivoted to the center piece $e^3$.

$e^{10}$ $e^{11}$ designate two levers, which extend beyond the ends of the car, one being pivoted to the slide $e^5$ and the other to the slide $e^6$. Upon these levers is secured a clamp or shoulder $e^{12}$, which, when the levers are moved in the proper direction, engage the brake-beam $e^{13}$, to which the brake-shoes are attached, and pushes it out of contact with the wheels. The beam is operated by a flat spring $e^{14}$, secured at its upper end to the frame of the car and its lower end to the brake-beam $e^{13}$. The mode of operation is as follows: When the push-bar on the tender comes in contact with the end E' of the bush-bar E, it forces it back. The center piece, being bolted to stays on the car-frame, remains stationary; but the slides $e^5$ $e^6$ are necessarily moved, thereby turning the lever $e^9$ in the direction indicated by dotted lines in the drawings. The levers $e^{10}$ $e^{11}$, being secured to the said slides, are pushed out, and the clamps or shoulders $e^{12}$, by coming in contact with the brake-beams $e^{13}$, carrying the brake-shoes, force them away from the wheels. When the steam is shut off from the cylinder, the springs $e^{14}$ cause the brake-shoes to engage the rims of the wheels again. Thus the brakes on a train of cars of any length may be operated with certainty and rapidity. When it is necessary to switch a car—say the last one—on a siding, it is desirable to keep the brakes on that car from being applied, in order that when the coupler is opened the said car may run some distance before stopping. To effect this, a locking device is used, which is constructed in the following manner:

F designates a bolt having an elongated slot $f$ at its lower end. This bolt works in a slot or opening $f'$ in the bumper $f^2$, and is kept in place by a pin, which passes through the slot $f$. In the end of the push-bar E is an opening $f^3$, corresponding to that in the bumper, and through this the bolt F passes.

It will readily be seen that should the bolt be pushed down the push-bar cannot move back, and thus the brakes will be kept off the wheels until the brakeman withdraws the bar, thus allowing the push-bar to be forced forward by means of the lever $e^9$, which is turned by springs $e^{15}$ $e^{16}$, connecting at one end to the said lever and at the opposite end to the frame of the car, each of the springs pulling in opposite directions, thereby causing the lever to resume its normal position and at the same time cause the brakes to apply themselves to the wheels.

The levers and their connections, for unlocking and locking the brakes on the passenger-car just described, are found to be very efficient, and preferable, when applied to cars of great length.

Having thus fully described my invention, what I claim as new, and desire to secure by Letters Patent, is—

1. In an automatic brake, the combination, with the push-bar, of a hollow or box-shaped guide for connecting the portions that pass around the trucks, a lever pivoted to the center portion, having arms connected therewith for operating slides moving in the said guide, levers pivoted to the slides and connecting with the beams carrying the brake-shoes and extending beyond the ends of the car to engage the heads of the push-bars of the cars at its front and rear ends, substantially as described.

2. In an automatic brake, the combination, with the push-bar, of a hollow or box-shaped guide for connecting the portions that pass around the trucks, a lever pivoted to the center portion and having arms connected therewith for operating slides moving in the said guides, levers pivoted to the slides and connecting with the beams carrying the brake-shoes and extending beyond the ends of the car to engage the heads of the push-bars on the cars at its front and rear ends, and springs connecting with the said lever and with the car-frame and operating in opposite directions, whereby, when the pressure is removed from the push-bar, the springs will cause the lever to resume its normal position and thus apply the brakes to the wheels, substantially as described.

In testimony that I claim the foregoing as my own I have hereunto affixed my signature in presence of two witnesses.

GEORGE WASHINGTON CISCO.

Witnesses:
H. F. BAUER,
JOSEPH JAY CISCO.